Patented Nov. 8, 1932

1,887,050

UNITED STATES PATENT OFFICE

KARL VIERLING, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

EXTRACTION OF ORGANIC SUBSTANCES

No Drawing. Application filed May 8, 1930, Serial No. 450,867, and in Germany May 6, 1929.

The present invention relates to the extraction of organic substances of high molecular weight from organized materials.

I have found that organic substances of high molecular weight such as sugars, alkaloids, bitter principles, saponins and the like can easily be obtained by treating organized materials i. e., material of vegetable or animal origin containing the said substances, such as plants, fruit, seeds, animal organs or the like with anhydrous, liquid ammonia. The ammonia employed must not be absolutely free from water in the strongest sense but it may contain up to 10 per cent of water. The process may be carried out at any desired pressure above atmospheric pressure in order to reduce the evaporation of ammonia; on the other hand the temperature of working will be generally not considerably increased above room temperature in order to avoid unduly high pressures and costly highly pressure-tight apparatus. Thus pure sugar sucrose may be recovered from sugar beet by means of liquid ammonia, since betain is not dissolved by liquid ammonia. For example cane sugar can be dissolved by means of liquid ammonia at about 20° centigrade at a pressure of 8 atmospheres in an amount of over 100 per cent of the ammonia employed. The process according to the present invention is especially advantageous when the crude material containing sugar is already in the dry state, as is the case for example with dry carob bean.

In addition, alkaloids such as nicotine, caffeine, lupinine and other similar substances can be recovered without difficulty by means of liquid ammonia from materials containing the said substances.

Contrasted with the employment of water the process according to the present invention has the advantage that the extraction residue and the extracted substances may be very readily recovered in a dry or anhydrous state; in many cases this may be effected merely by separating the extraction liquid from the extraction materials and evaporating the former (releasing the pressure on the liquid ammonia), which evaporation may be very readily effected.

The following examples will further illustrate the nature of this invention, but the invention is not restricted to these examples.

Example 1

100 kilograms of dried slices of sugar beet are treated at 20° centigrade at a pressure of 8 atmospheres with 40 kilograms of liquid ammonia. The solution obtained, which contains the whole of the sugar content of the slices, is then freed from the coloring materials and other undesirable accompanying substances in the usual manner for example by means of decolorizing carbon. After evaporation of the ammonia crystalline cane sugar which is ready for use remains behind. In addition, slices which are free from water are obtained, the food value of which is increased by the fact that the organic acids contained in the sugar beet have been converted into their ammonium salts which protect the albumen present.

Example 2

20 kilograms of tobacco leaves are treated with 60 kilograms of liquid ammonia for about 1 hour at 20° centigrade and about 8 atmospheres whereby three fifths of the original content of nicotine are removed from the leaves, the nicotine removed being obtained in the form of a mixture thereof with some unknown resinous substances. According to the pressure and the duration of the treatment selected, larger or smaller amounts of nicotine and resinous substances are extracted from the tobacco.

Example 3

100 kilograms of shredded beans of lupines are treated with 80 kilograms of liquid ammonia. The extraction residue is a product free from bitterness which is suitable as a foodstuff for cattle.

Example 4

1 kilogram of Quillaja bark is treated for 3 hours at 20° centigrade and about 8 atmospheres with 2 kilograms of liquid ammonia.

The extracted material is a pure saponin of yellowish shade.

Example 5

Roasted and ground coffee beans are treated with liquid ammonia at 20° C. and a pressure of 7 atmospheres in a diffusion apparatus as employed for leaching sugar from beet roots. The alkaloids and any flavors are dissolved, so that, after evaporation of the ammonia, a highly valuable water-soluble extract is obtained.

What I claim is:—

1. The process for the extraction of sucrose from vegetable materials containing the same which comprises treating the said materials with liquid ammonia at superatmospheric pressure.

2. The process for the extraction of sucrose from vegetable materials containing the same which comprises treating the said materials with liquid ammonia at a pressure of about 8 atmospheres.

3. The process for the extraction of sucrose from vegetable materials containing the same with comprises treating dried vegetable materials containing sugars with liquid ammonia at superatmospheric pressure.

4. The process for the extraction of sucrose from vegetable materials containing the same which comprises treating dried vegetable materials with liquid ammonia containing up to 10 per cent of water at superatmospheric pressure.

5. The process for the extraction of cane sugar from dried vegetable materials containing the same with liquid ammonia at about 20° C. and at a pressure of about 8 atmospheres.

In testimony whereof I have hereunto set my hand.

KARL VIERLING.